(12) United States Patent
Abe et al.

(10) Patent No.: US 8,963,489 B2
(45) Date of Patent: Feb. 24, 2015

(54) CONTACTLESS POWER TRANSFER DEVICE FOR MOVING OBJECT

(75) Inventors: Shigeru Abe, Saitama (JP); Tomio Yasuda, Saitama (JP); Akira Suzuki, Aichi (JP)

(73) Assignees: Technova Inc., Tokyo (JP); National University Corporation SAITAMA UNIVERSITY, Saitama (JP)

( * ) Notice: Subject to any disclaimer, the term of this patent is extended or adjusted under 35 U.S.C. 154(b) by 1 day.

(21) Appl. No.: 14/000,332

(22) PCT Filed: Feb. 20, 2012

(86) PCT No.: PCT/JP2012/053996
§ 371 (c)(1),
(2), (4) Date: Aug. 19, 2013

(87) PCT Pub. No.: WO2012/115047
PCT Pub. Date: Aug. 30, 2012

(65) Prior Publication Data
US 2013/0320759 A1 Dec. 5, 2013

(30) Foreign Application Priority Data

Feb. 21, 2011 (JP) ................................. 2011-034916

(51) Int. Cl.
*H01M 10/46* (2006.01)
*H01F 38/14* (2006.01)
*B60L 11/18* (2006.01)
(Continued)

(52) U.S. Cl.
CPC .............. *H01F 38/14* (2013.01); *B60L 11/182* (2013.01); *H02J 5/005* (2013.01); *H02J 7/025* (2013.01); *H01F 27/28* (2013.01); *B60R 16/03* (2013.01); *Y02T 10/7088* (2013.01);
(Continued)

(58) Field of Classification Search
USPC .......................... 320/104, 107, 108, 109, 115
See application file for complete search history.

(56) References Cited

U.S. PATENT DOCUMENTS

2010/0033156 A1 2/2010 Abe et al.
2010/0201315 A1 8/2010 Oshimi et al.
(Continued)

FOREIGN PATENT DOCUMENTS

JP 2008288889 A 11/2008
JP 2010-130729 A 6/2010
(Continued)

OTHER PUBLICATIONS

International Search Report mailed May 1, 2012 in PCT/JP2012/053996.
(Continued)

*Primary Examiner* — Edward Tso
(74) *Attorney, Agent, or Firm* — Rothwell, Figg, Ernst & Manbeck, P.C.

(57) ABSTRACT

Provided is a contactless power transfer device for a moving object. Each of a power transmission coil and a power receiving coil comprises an H-shaped core, and first, second and third search coils are installed on a magnetic pole object of the H-shaped core of the power transmission coil. A y-direction positional deviation between the power transmission coil and the power receiving coil is detected using voltages measured at the first and second search coils, and an x-direction positional deviation is detected using voltages measured at the third search coils.

8 Claims, 16 Drawing Sheets

(51) Int. Cl.
- *H02J 5/00* (2006.01)
- *H02J 7/02* (2006.01)
- *H01F 27/28* (2006.01)
- *B60R 16/03* (2006.01)

(52) U.S. Cl.
CPC ............. *Y02T 10/7005* (2013.01); *Y02T 90/14* (2013.01); *Y02T 90/122* (2013.01)
USPC .......................................................... 320/108

(56) References Cited

U.S. PATENT DOCUMENTS

2012/0119698 A1* 5/2012 Karalis et al. .................. 320/108
2013/0119929 A1* 5/2013 Partovi ........................... 320/108

FOREIGN PATENT DOCUMENTS

| JP | 2011-50127 A | 3/2011 |
| WO | 2007/029438 A1 | 3/2007 |
| WO | WO 2009/041058 A1 | 4/2009 |

OTHER PUBLICATIONS

Kanai Kenji, et al. "Solution to Voltage Ratio Problem on the Moving Pick-up Type Contactless Power Transfer System using Series and Parallel Resonant Capacitors," Technical Meeting on Semiconductor Power Converter, SPC-10-021 (Jan. 29, 2010) (9 pages).

M. Budhia, et al. "A New IPT Magnetic Coupler for Electric Vehicle Charging Systems," to be presented at 36th Annual Conference of the IEEE Industrial Electronics Society, IECON 2010, Phoenix AZ, USA (Nov. 7-10, 2010) (2481-2486, 6 pages).

* cited by examiner

MAGNETIC FIELD DISTRIBUTION WHEN POSITIONAL DEVIATION IN y DIRECTION IS 150 mm (100 W POWER TRANSFER)

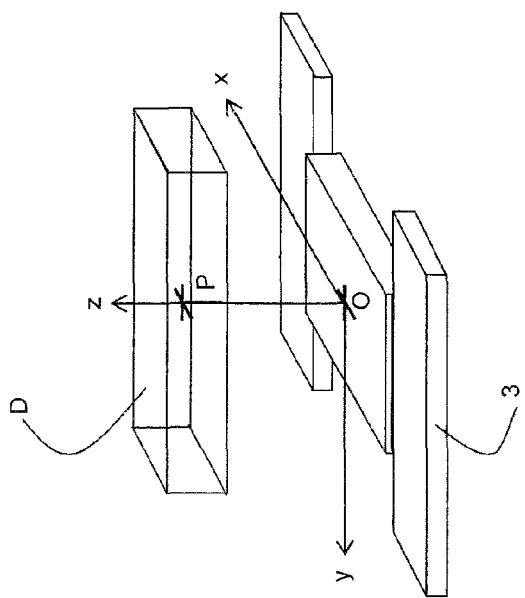
FIG.20B
FIG.20C
| EXAMPLE OF POWER TRANSFERABLE RANGE | |
|---|---|
| NORMAL STATE (x, y, z) | (0, 0, 70) |
| FRONT-REAR DIRECTION x [mm] | ± 45 |
| LEFT-RIGHT DIRECTION y [mm] | ± 150 |
| GAP LENGTH z [mm] | ± 30 |
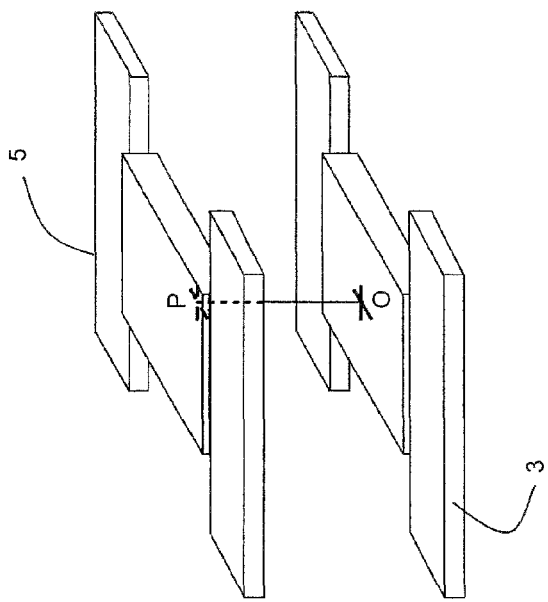
FIG.20A

CONTACTLESS POWER TRANSFER DEVICE FOR MOVING OBJECT

CROSS REFERENCE TO RELATED APPLICATIONS

This application is a 35 U.S.C. 371 National Phase Entry Application from PCT/JP2012/053996, filed Feb. 20, 2012, which claims the benefit of Japanese Patent Application No. 2011-034916, filed Feb. 21, 2011, the disclosures of which are incorporated herein in their entirety by reference.

TECHNICAL FIELD

The present invention relates to a contactless power transfer device for a moving object, which transfers power to a moving object such as an electric vehicle without any contact, and which can easily determine whether a positional deviation between a power transmission coil and a power receiving coil is within an acceptable range when transferring power.

BACKGROUND ART

A contactless power transfer device includes a contactless power transfer transformer having a power transmission coil (primary coil) and a power receiving coil (secondary coil) and a capacitor connected to the power transmission coil and the power receiving coil and supplies power from the power transmission coil to the power receiving coil by using electromagnetic induction between the power transmission coil and the power receiving coil.

A contactless power transfer system including the contactless power transfer device includes a high-frequency power source that supplies high-frequency AC to the power transmission coil of the contactless power transfer device and a secondary rectifier that converts AC transmitted to the power receiving coil of the contactless power transfer device into DC. In a contactless power transfer system for charging a vehicle, the power transmission coil connected to the high-frequency power source is installed in the ground of a power transfer station, the power receiving coil is mounted on a lower surface of a floor of the vehicle, and high-frequency AC induced in the power receiving coil is rectified by the secondary rectifier installed in the vehicle and charges a secondary battery in the vehicle.

In the case of a contactless power transfer device for charging a vehicle, a positional deviation in the horizontal direction and a gap length variation in the vertical direction between the power transmission coil and the power receiving coil easily occur. If power is transferred with a large positional deviation left unchanged, it causes problems that the power transfer efficiency significantly degrades, the lower surface of the floor of the vehicle near the power receiving coil is heated, the strength of magnetic flux that leaks to the outside of the vehicle increases, and so on.

Therefore, in the contactless power transfer system for charging a vehicle, an acceptable range of the positional deviation between the power transmission coil and the power receiving coil in the front-rear direction, the left-right direction, and the up-down direction are determined, and the vehicle to which power is transferred is requested to be parked so that the power receiving coil is inside the acceptable range with respect to the power transmission coil.

The acceptable range (power transferable range) is set, for example, as illustrated in FIG. 20 by considering convenience of parking, prevention of adverse effects of magnetic flux leakage due to positional deviation, restriction of variation range of voltage ratio between the primary and the secondary voltages, and so on. In FIG. 20, the power transmission coil is represented by reference numeral 3, the power receiving coil is represented by reference numeral 5, and the acceptable range of the center P of the power receiving coil 5 with respect to the center O of the power transmission coil 3 is represented by D.

In the front-rear direction (x direction), a positional deviation up to 45 mm from a normal state (positional deviation is 0) is acceptable.

In the left-right direction (y direction), a positional deviation up to 150 mm from a normal state (positional deviation is 0) is acceptable.

In the up-down direction (z direction), a positional deviation up to 30 mm from a normal state (gap length is 70 mm) is acceptable.

In FIG. 20, the z direction component (length) of the line segment OP represents a mechanical gap between the power transmission coil and the power receiving coil.

In a power transfer station for buses in Europe, as illustrated in FIG. 21A, a method is employed in which a concrete block 72 is arranged on a road shoulder where the power transmission coil 3 is installed in the ground and a bus stops at a position with no positional deviation by causing a tire 71 to slide on the concrete block 72. In the up-down direction, as illustrated in FIG. 21B, it is designed so that an appropriate gap length is obtained when the power receiving coil 5 is lowered and comes into contact with the ground through a spacer 73.

In Patent Literature 1 below, as illustrated in FIG. 22, a contactless power transfer device is disclosed in which, the power transmission coil 3 and the power receiving coil 5 are formed by a coil (one side winding coil) in which a winding wire is arranged on one surface of a core, communication coils 15 are disposed at the centers of the power transmission coil 3 and the power receiving coil 5, and when communication sensitivity between the communication coils 15 reaches a certain level, it is determined that the power transmission coil 3 and the power receiving coil 5 enter the power transferable range.

As a circuit system of the contactless power transfer, various methods disclosed in Patent Literature 2 and Non-patent Literatures 1 and 2 below are known as described later.

CITATION LIST

Patent Literature

Patent Literature 1: Japanese Patent Laid-open No. 2008-288889

Patent Literature 2: International Publication No. 2007-029438

Non-Patent Literature

Non-Patent Literature 1: Kanai Kenji, Kaneko Yasuyoshi, and Abe Shigeru, "Solution to Voltage Ratio Problem on the Moving Pick-up Type Contactless Power Transfer System using Series and Parallel Resonant Capacitors" Technical Meeting on Semiconductor Power Converter, SPC-10-021, (2010 Jan. 29)

Non-Patent Literature 2: M. Budhia, G. A. Covic, and J. T. Boys "A New Magnetic Coupler for Inductive Power Transfer Electric Vehicle Charging Systems" to be presented at 36th Annual Conference of the IEEE Industrial Electronics Society, IECON 2010, Phoenix, Ariz., USA, Nov. 7-10, 2010)

SUMMARY OF INVENTION

Problem to be Solved by the Invention

However, in the method in which the left-right position of the vehicle is controlled by the concrete block and the power receiving coil is guided inside the power transferable range, it is difficult to drive the vehicle and the tire may be damaged, so that the method is difficult to be applied to general vehicles. In the method in which a power receiving transformer is moved vertically, the system becomes complex and thereby the cost is increased. In these methods in which position is mechanically controlled, power has to be transferred in small acceptable range, so that it is not possible to take advantage of the contactless power transfer transformer which can expand the power transferable range by devising the winding method of the coil and the like.

The method in which the power transferable range is determined on the basis of the communication sensitivity between the communication coils provided to the power transmission coil and the power receiving coil has a disadvantage where, if it is determined to be outside the power transferable range, it is difficult to know which direction the vehicle should be moved, forward, backward, rightward, or leftward. The power transferable range is determined by a transmission range of the communication coils, so that it is difficult for the power transferable range to correspond to the performance of the contactless power transfer device.

The present invention has been made in view of the above circumstances and an object of the present invention is to provide a contactless power transfer device for a moving object, which can easily determine whether the positional deviation between the power transmission coil and the power receiving coil is within the acceptable range and which can identify a direction in which the positional deviation outside the acceptable range is corrected.

Means for Solving Problem

The present invention is a contactless power transfer device for a moving object, in which a power transmission coil connected to a high-frequency power source is installed on the ground, a power receiving coil facing the power transmission coil with a gap in between is installed in the moving object, and power is transferred from the power transmission coil to the power receiving coil. Each of the power transmission coil and the power receiving coil has an H-shaped core. Core portions in parallel with each other in the core form magnetic poles. A core portion that connects between the magnetic poles facing each other forms a wire-wound portion around which a wire is wound. The power receiving coil is installed in the moving object so that the core portions in parallel with each other are perpendicular to a front-back direction of the moving object. In the H-shaped core of the power transmission coil or the power receiving coil, at least one of the magnetic poles includes a first search coil SC1 that intersects a magnetic flux proceeding toward one end of the magnetic pole from the wire-wound portion and a magnetic flux proceeding in the opposite direction and a second search coil SC2 that intersects a magnetic flux proceeding toward the other end of the magnetic pole from the wire-wound portion and a magnetic flux proceeding in the opposite direction. The contactless power transfer device for a moving object further includes a power transferable range identification unit that uses a voltage detected by the first search coil SC1 or the second search coil SC2 to identify whether the power transmission coil and the power receiving coil are located inside the power transferable range.

Detection voltages of the first and the second search coils SC1 and SC2 are highly sensitive to the positional deviation in the left-right direction, so that it is possible to determine whether the positional deviation between the power transmission coil and the power receiving coil in the left-right direction is within an acceptable range by using the detection voltages of SC1 and SC2.

Further, the contactless power transfer device for a moving object of the present invention is characterized in that the H-shaped core of the power transmission coil or the power receiving coil further includes a third search coil SC3 that intersects a magnetic flux proceeding straight in the magnetic pole in an extending direction of the wire-wound portion and a magnetic flux proceeding in the opposite direction, and the power transferable range identification unit identifies whether the power transmission coil and the power receiving coil are located inside the power transferable range by also using a voltage detected by the third search coil SC3.

A detection voltage of the third search coil SC3 is highly sensitive to the positional deviation in the front-rear direction, so that it is possible to determine whether the positional deviation between the power transmission coil and the power receiving coil in the front-rear direction is within an acceptable range by using the detection voltage of SC3.

Further, the contactless power transfer device for a moving object of the present invention is characterized by further including a primary side capacitor that is connected in series between the power transmission coil and the high-frequency power source and a secondary side resonant capacitor that is connected in parallel with the power receiving coil. When a primary voltage, which is an output voltage of the high-frequency power source, is defined as VIN, a secondary voltage applied to both ends of the power receiving coil is defined as V2, the number of windings of the power transmission coil is defined as N1, and the number of windings of the power receiving coil is defined as N2, the power transferable range identification unit identifies whether the power transmission coil and the power receiving coil are located inside the power transferable range by also using a value of b represented by $$b = (VIN/V2)(N2/N1) \qquad \text{(Expression 1)}.$$

In a circuit in which a primary side capacitor having an appropriate value is connected in series with the power transmission coil and a secondary side resonant capacitor is connected in parallel with the power receiving coil, the (Expression 1) is established, so that the value of b can be calculated from the primary voltage VIN, the secondary voltage V2, and a turn ratio a (=N1/N2) between the power transmission coil and the power receiving coil.

A voltage ratio between the primary voltage and the secondary voltage is highly sensitive to the positional deviation of the gap length, so that it is possible to determine whether the positional deviation of the gap length between the power transmission coil and the power receiving coil is within an acceptable range by using the value of b.

Further, in the contactless power transfer device for a moving object of the present invention, the first search coil SC1 and the second search coil SC2 are wounded around a circumference of the magnetic pole so that the magnetic pole is included inside the coils and the third search coil SC3 is arranged on surfaces of the magnetic pole so that a surface of the magnetic pole, which extends in an extending direction of the wire-wound portion, and a side surface of the magnetic pole, which is perpendicular to the extending direction, are included inside the coil.

The first and the second search coils SC1 and SC2 generate induced electromotive force according to variation of the magnetic flux passing through the magnetic pole inside the coils and the third search coil SC3 generates induced electromotive force according to variation of the magnetic flux passing through the coil cross-section area.

Further, in the contactless power transfer device for a moving object of the present invention, the magnetic pole of the H-shaped core of the power transmission coil or the power receiving coil includes two cores with a gap in between. The first search coil SC1 and the second search coil SC2 may be wounded around circumferences of the two cores so that the two cores are included inside the coils and the third search coil SC3 may be wound around a core member that connects the gap between the two cores. By doing so, it is possible to improve the detection accuracy of the third search coil SC3.

Further, in the contactless power transfer device for a moving object of the present invention, when the power transmission coil and the power receiving coil are not located inside the power transferable range, the power transferable range identification unit provides information of a moving direction for the power transmission coil and the power receiving coil to enter the power transferable range.

Therefore, when the power transmission coil and the power receiving coil are out of the power transferable range, it is easy to know how to deal with the situation.

Further, in the contactless power transfer device for a moving object of the present invention, the power transferable range identification unit may be provided in a vehicle, and the information of a moving direction provided by the power transferable range identification unit may be displayed on a display screen of a car navigation system installed in the vehicle.

It is possible to provide the information of a moving direction used for the power transmission coil and the power receiving coil to enter the power transferable range through a human interface.

Effect of the Invention

The contactless power transfer device for a moving object of the present invention can accurately determine whether the positional deviation between the power transmission coil and the power receiving coil is included in the power transferable range. When the positional deviation is out of the power transferable range, it is possible to recognize in which direction the position of the moving object should be directed.

BRIEF DESCRIPTION OF DRAWINGS

FIGS. 20A-20C are examples of the acceptable range of the positional deviation;

MODE(S) FOR CARRYING OUT THE INVENTION

Figure 1:
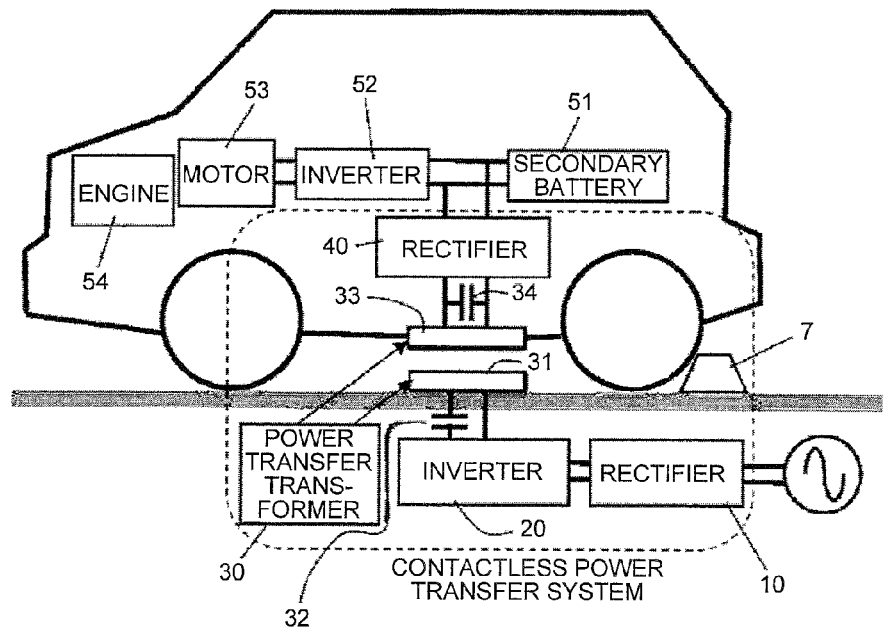
FIG. 1 is a diagram illustrating a contactless power transfer system for charging a vehicle.

FIG. 1 schematically illustrates a mode in which a contactless power transfer device of the present invention is used to charge a plug-in hybrid vehicle.

The plug-in hybrid vehicle to be charged is mounted with an engine 54 and a motor 53 as drive sources and includes a secondary battery 51 that is a power source of the motor and an inverter 52 that converts DC of the secondary battery into AC and supplies the AC to the motor.

A contactless power transfer system that transfers power to the secondary battery 51 includes, on the ground side, a rectifier 10 that converts AC of commercial power source into DC, an inverter 20 that generates high-frequency AC from DC, a power transmission coil 31 which is one side of a contactless power transfer transformer 30, and a primary side series capacitor 32 that is connected in series to the power transmission coil, and includes, on the vehicle side, a power receiving coil 33 which is the other side of the contactless power transfer transformer 30, a rectifier 40 that converts AC into DC for the secondary battery, and a secondary side parallel resonant capacitor 34 that is connected in parallel between the power receiving coil and the rectifier.

Figure 2:
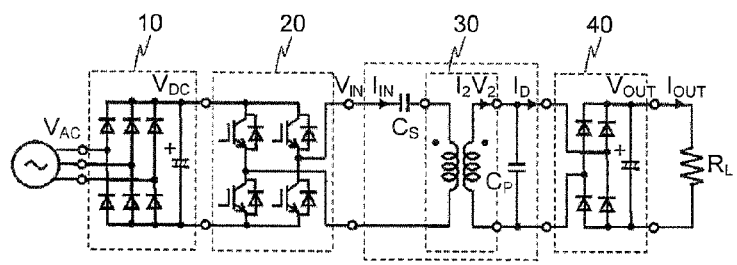
FIG. 2 is a circuit diagram of FIG. 1.
Figure 3:
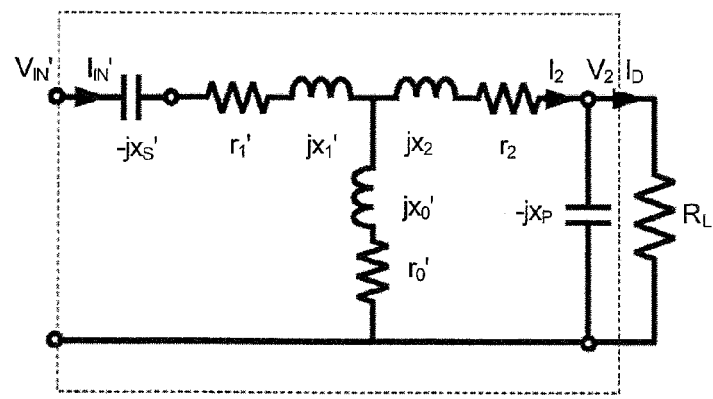
FIG. 3 is a diagram illustrating a detailed equivalent circuit of a contactless power transfer transformer in the circuit in FIG. 2.

FIG. 2 illustrates a circuit diagram of the contactless power transfer system. FIG. 3 illustrates a detailed equivalent circuit including the contactless power transfer transformer, the primary side series capacitor, and the secondary side parallel capacitor in FIG. 2.

In this circuit, as described in Patent Literature 2 (International Publication No. 2007-029438), a value CS of the primary side series capacitor and a value CP of the secondary side parallel resonant capacitor are set as the expressions below.

$$\omega 0 = 2\pi f0 \quad \text{(Expression 2)}$$

$$1/\omega 0 CP = \omega 0 L2 = xP = x0' + x2 \quad \text{(Expression 3)}$$

$$1/\omega 0 CS = xS' = \{(x0' \cdot x2)/(x0' + x2)\} + x1' \quad \text{(Expression 4)}$$

(Here, f0: frequency of a high-frequency power source, xP: capacitive reactance of the secondary side parallel capacitor CP, L2: self-inductance of the power receiving coil, xS': capacitive reactance of the primary side series capacitor CS which is converted into the secondary side, x0': excitation reactance converted into the secondary side, x1': primary leakage reactance converted into the secondary side, and x2: secondary leakage reactance)

The (Expression 3) represents a condition for the secondary side parallel capacitor to resonate with the self-inductance of the power receiving coil at the frequency of the power source and the (Expression 4) represents a condition for the impedance of the contactless power transfer device as seen from the output of the high-frequency power source to be a pure resistance and for the output power factor of the high-frequency power source to be 1 when a secondary side load is represented by an equivalent resistance RL. When the output power factor is 1, the apparent power of the high-frequency power source corresponds to the output power, so that the power source can be downsized, and further, when the power source is formed by a bridge-type inverter as illustrated in FIG. 2, soft switching is possible, so that there is a significant advantage that the efficiency of the inverter is improved. In the case of a contactless power transfer device of an electric vehicle, the secondary side load RL can be generally assumed to be a pure resistance.

When setting is performed as described above, the contactless power transfer transformer is equivalent to an ideal transformer and the relationships of (Expression 5) and (Expression 6) described below are established.

$$VIN = abV2, IIN = ID/ab \quad \text{(Expression 5)}$$

$$a = N1/N2, b = x0'/(x0' + x2) \quad \text{(Expression 6)}$$

Here, a is a turn ratio between the power transmission coil and the power receiving coil. Here, b is a value similar to a coupling coefficient k and b can be calculated by the expression below from the primary voltage VIN, the secondary voltage V2, and the turn ratio a.

$$b = (VIN/V2)(1/a) \quad \text{(Expression 7)}$$

The gap length between the power transmission coil 31 and the power receiving coil 33 significantly affects the voltage ratio between the primary voltage VIN and the secondary voltage V2. Therefore, the voltage ratio (VIN/V2) can be an index to determine suitability of the gap length. In the present invention, the value of b is used as an index of the voltage ratio (VIN/V2).

Figure 4A:
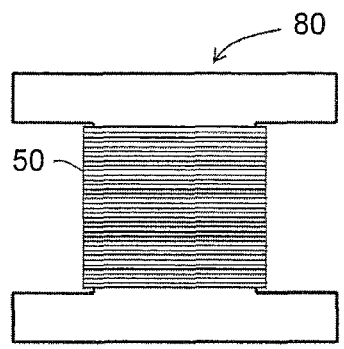
FIGS. 4A-4B are diagrams illustrating an H-shaped core.
Figure 4B:
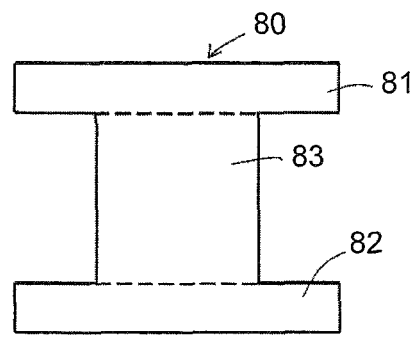

As illustrated in FIG. 4, the power transmission coil 31 and the power receiving coil 33 have a core with an H shape (H-shaped core) 80. Core portions 81 and 82 in parallel with each other in the H-shaped core 80 form magnetic poles from which magnetic flux is inputted and outputted, and a core portion 83 that connects between the magnetic poles 81 and 82 facing each other forms a wire-wound portion 83 around which a wire 50 is wound.

Figure 5:
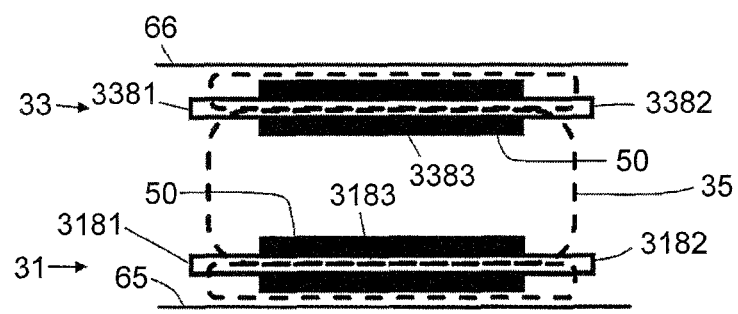
FIG. 5 is a diagram illustrating magnetic fluxes of a contactless power transfer transformer in which the power transmission coil and a power receiving coil are both side winding coils.

In the contactless power transfer transformer formed by both sides wound coil in which the power transmission coil 31 and the power receiving coil 33 are formed by winding a wire around the H-shaped core, as illustrated in FIG. 5, main magnetic flux 35 rotates so that the main magnetic flux 35 enters the magnetic pole 3381 of the H-shaped core of the power receiving coil 33 from the magnetic pole 3181 of the H-shaped core of the power transmission coil 31, passes through the core of the wire-wound portion 3383 around which the wire 50 is wound, enters the magnetic pole 3182 of the H-shaped core of the power transmission coil 31 from the other magnetic pole 3382, passes through the core of the wire-wound portion 3183, and reaches the magnetic pole 3181. The next moment, the main magnetic flux 35 rotates in the reverse route, and repeats the rotations alternately. In the contactless power transfer transformer, aluminum plates 65 and 66 are arranged on the rear surfaces of the coils in order to magnetically shield magnetic flux leakage.

Figure 6:
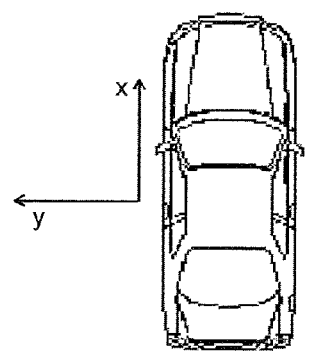
FIG. 6 is a diagram indicating an x direction and a y direction of a vehicle.

The power receiving coil 33 is installed on the floor of the vehicle outside the vehicle so that the magnetic poles 81 and 82 in parallel with each other are perpendicular to the front-rear direction of the vehicle (x direction in FIG. 6) and in parallel with the left-right direction of the vehicle (y direction in FIG. 6).

Figure 7A:
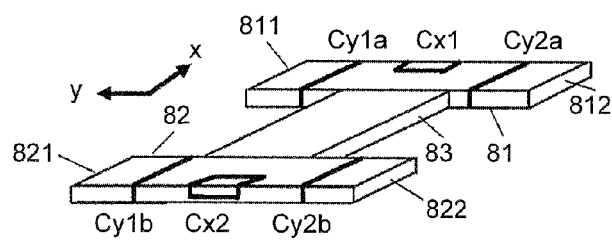
FIGS. 7A-7C are diagrams illustrating a power transmission coil of a contactless power transfer device for a moving object according to an embodiment of the present invention.
Figure 7B:
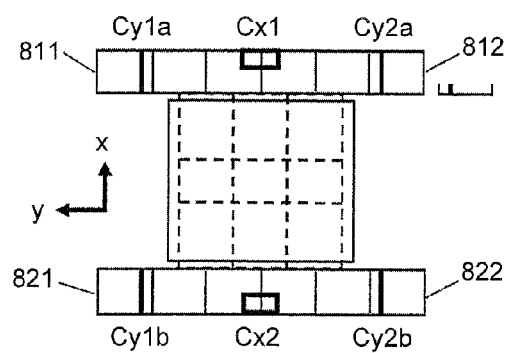
Figure 7C:
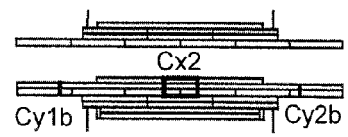

As illustrated in the perspective view of FIG. 7A, the plan view of FIG. 7B, and the side view of FIG. 7C, the H-shaped core of the power transmission coil 31 is provided with a search coil Cy1a (the first search coil SC1) that intersects a magnetic flux proceeding toward one end 811 of the magnetic pole 81 from the wire-wound portion 83 (and a magnetic flux proceeding in the opposite direction), a search coil Cy2a (the second search coil SC2) that intersects a magnetic flux proceeding toward the other end 812 of the magnetic pole 81 from the wire-wound portion 83 (and a magnetic flux proceeding in the opposite direction), a search coil Cy1b (the first search coil SC1) that intersects a magnetic flux proceeding toward one end 821 of the magnetic pole 82 from the wire-wound portion 83 (and a magnetic flux proceeding in the opposite direction), a search coil Cy2b (the second search coil SC2) that intersects a magnetic flux proceeding toward the other end 822 of the magnetic pole 82 from the wire-wound portion 83 (and a magnetic flux proceeding in the opposite direction), a search coil Cx1 (the third search coil SC3) that intersects a magnetic flux proceeding straight in the magnetic pole 81 in an extending direction of the wire-wound portion 83 (and a magnetic flux proceeding in the opposite direction), and a search coil Cx2 (the third search coil SC3) that intersects a magnetic flux proceeding straight in the magnetic pole 82 in the extending direction of the wire-wound portion 83 (and a magnetic flux proceeding in the opposite direction).

The search coils Cy1a and Cy2a are wound around a core member that forms the magnetic pole 81 and the search coils Cy1b and Cy2b are wound around a core member that forms the magnetic pole 82.

The search coil Cx1 is arranged on a surface of the magnetic pole 81 extending in the extending direction of the wire-wound portion 83 and a side surface of the magnetic pole 81 perpendicular to the extending direction of the wire-wound portion 83 so that the opening of the coil overlaps the surface and the side surface and the search coil Cx2 is arranged on a surface of the magnetic pole 82 extending in the extending direction of the wire-wound portion 83 and a side surface of the magnetic pole 82 perpendicular to the extending direction of the wire-wound portion 83 so that the opening of the coil overlaps the surface and the side surface. In this example, the number of windings of all the search coils is set to 10.

These search coils generate induced electromotive force according to variation of the magnetic flux in the opening of the coil and the voltages of the induced electromotive forces are inputted into a power transferable range identification unit (not illustrated in the drawings). The power transferable range identification unit identifies whether the power transmission coil 31 and the power receiving coil 33 are located inside the power transferable range by using the voltages.

Figure 8:
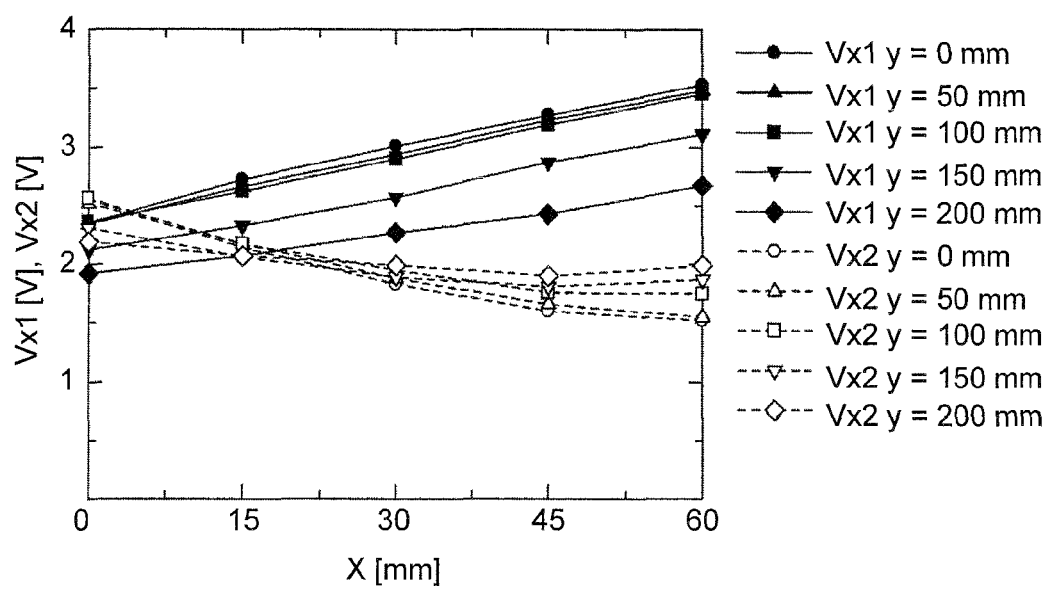
FIG. 8 is a diagram illustrating detection voltages of search coils, which are caused by positional deviation in a front-rear direction.

When the gap length is set to a constant value (70 mm) with respect to the power transmission coil 31 and the power receiving coil 33 is shifted in +x direction (front direction: direction toward the search coil Cx1), the voltage Vx1 of the search coil Cx1 and the voltage Vx2 of the search coil Cx2 vary as illustrated in FIG. 8. In FIG. 8, the horizontal axis represents the amount of deviation in the x direction and the vertical axis represents the voltages of the search coils Cx1 and Cx2. FIG. 8 illustrates the voltages Vx1 and Vx2 of the search coils Cx1 and Cx2 when the amount of deviation in the y direction (left-right direction) is increased from 0 (normal state) by steps of 50 mm.

From FIG. 8, it is known that as the amount of deviation in the +x direction increases, the detection voltage of the search coil Cx1 monotonically increases. On the other hand, when the power receiving coil 33 is shifted in −x direction (rear direction), the detection voltage of the search coil Cx2 monotonically increases according to the amount of deviation.

In this way, the voltages Vx1 and Vx2 of the search coil Cx1 and the search coil Cx2 are highly sensitive to the positional deviation in the x direction (front-rear direction) and the direction of the positional deviation can be known from the voltages Vx1 and Vx2.

Figure 9:
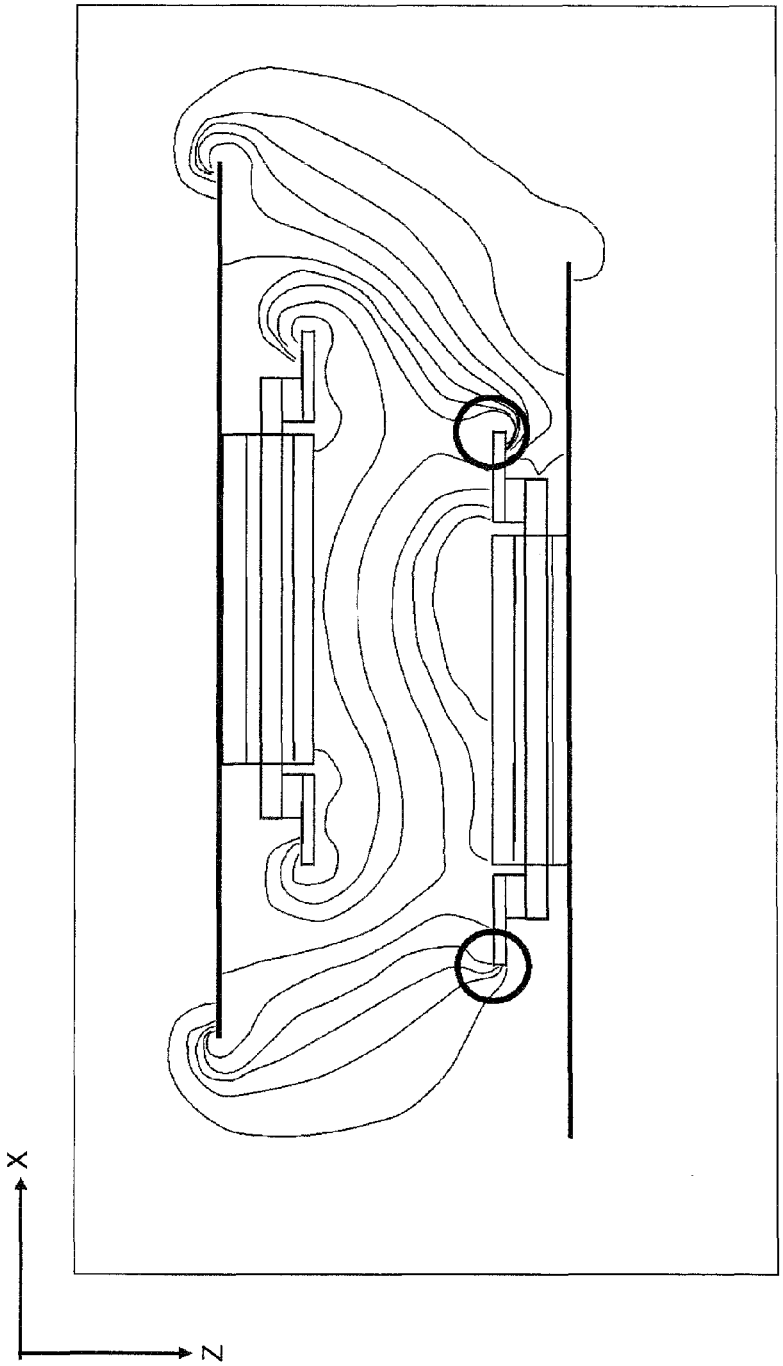
FIG. 9 is a diagram illustrating magnetic field distribution when the power transmission coil and the power receiving coil of the contactless power transfer transformer is deviated from each other in the x direction.

FIG. 9 illustrates magnetic field distribution when the power transmission coil (lower side) and the power receiving coil (upper side) of a contactless power transfer transformer which transfers power by electric power of 100 W are shifted from each other by 45 mm in the x direction. From FIG. 9, it is known that the amount of magnetic flux at the magnetic pole positions (indicated by circles) of the power transmission coil in which the search coils Cx1 and Cx2 are installed is different between the front and the rear of the power transmission coil.

Figure 10:
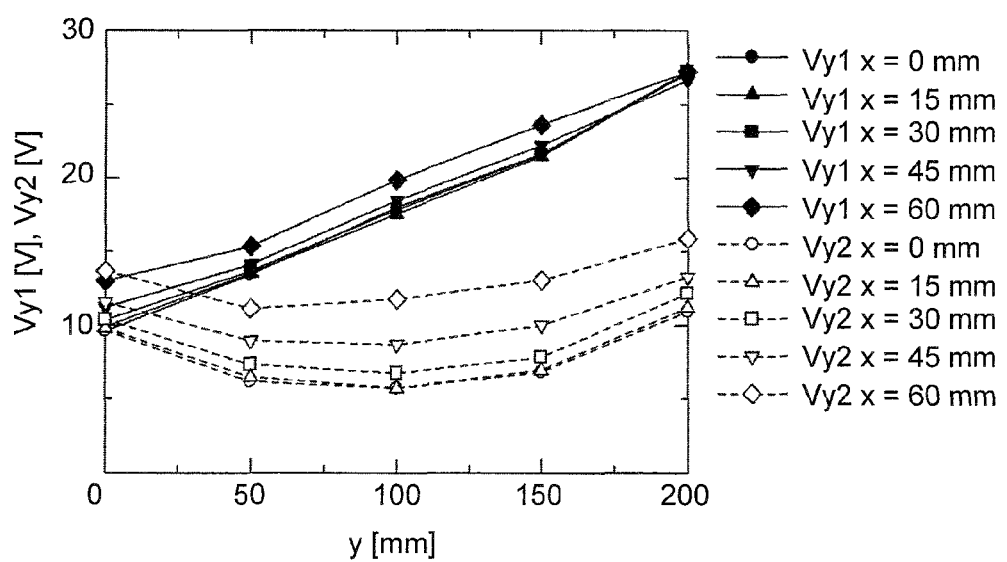
FIG. 10 is a diagram illustrating detection voltages of the search coils, which are caused by positional deviation in a left-right direction.

FIG. 10 illustrates the detection voltages of the search coils when the gap length is set to a constant value (70 mm) and the power receiving coil 33 is shifted in the +y direction. Here, the vertical axis represents the average value Vy1 (=(Vy1a+Vy1b)/2) of the detection voltage Vy1a of the search coil Cy1a and the detection voltage Vy1b of the search coil Cy1b and the average value Vy2 (=(Vy2a+Vy2b)/2) of the detection voltage Vy2a of the search coil Cy2a and the detection voltage Vy2b of the search coil Cy2b and the horizontal axis represents the amount of deviation in the y direction. FIG. 10 illustrates the voltages Vy1 and Vy2 when the amount of deviation in the x direction (front direction) is increased from 0 (normal state) by steps of 15 mm.

From FIG. 10, it is known that as the amount of deviation in the +y direction (direction toward the search coils Cy1a and Cy1b) increases, the detection voltages of the search coils Cy1a and Cy1b monotonically increase. On the other hand, when the power receiving coil 33 is shifted in −y direction (direction toward the search coils Cy2a and Cy2b)), the detection voltages of the search coils Cy2a and Cy2b monotonically increase according to the amount of deviation.

In this way, the voltages Vy1 and Vy2 of the search coils Cy1a and Cy1b and the search coils Cy2a and Cy2b are highly sensitive to the positional deviation in the y direction (left-right direction) and the direction of the positional deviation can be known from the voltages Vy1 and Vy2.

Figure 11:
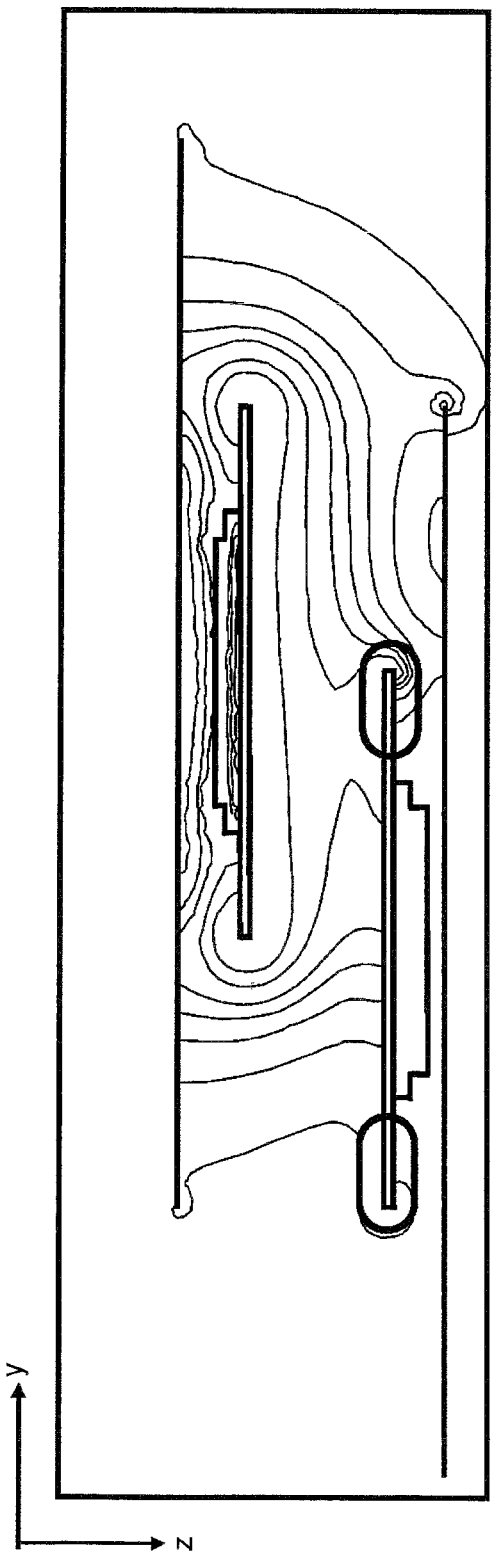
FIG. 11 is a diagram illustrating magnetic field distribution when the power transmission coil and the power receiving coil of the contactless power transfer transformer is deviated from each other in the y direction.

FIG. 11 illustrates magnetic field distribution when the power transmission coil (lower side) and the power receiving coil (upper side) of the contactless power transfer transformer which transfers power by electric power of 100 W are shifted from each other by 150 mm in the y direction. From FIG. 11, it is known that the amount of magnetic flux at the magnetic pole positions (indicated by ellipses) of the power transmission coil in which the search coils Cy1a and Cy2a are installed is different between the left and the right of the power transmission coil.

Figure 12:
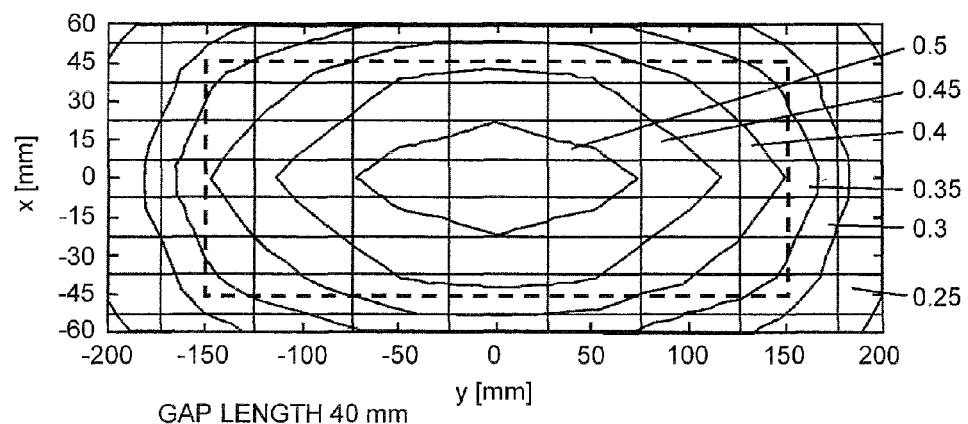
FIG. 12 is a diagram illustrating a relationship between the positional deviation in the front-rear/left-right directions and a value of b (gap length is 40 mm)
Figure 13:
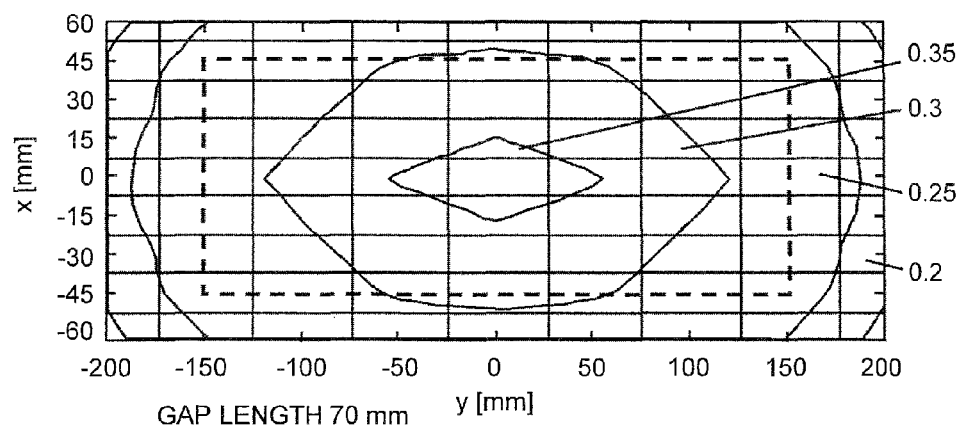
FIG. 13 is a diagram illustrating a relationship between the positional deviation in the front-rear/left-right directions and a value of b (gap length is 70 mm)
Figure 14:
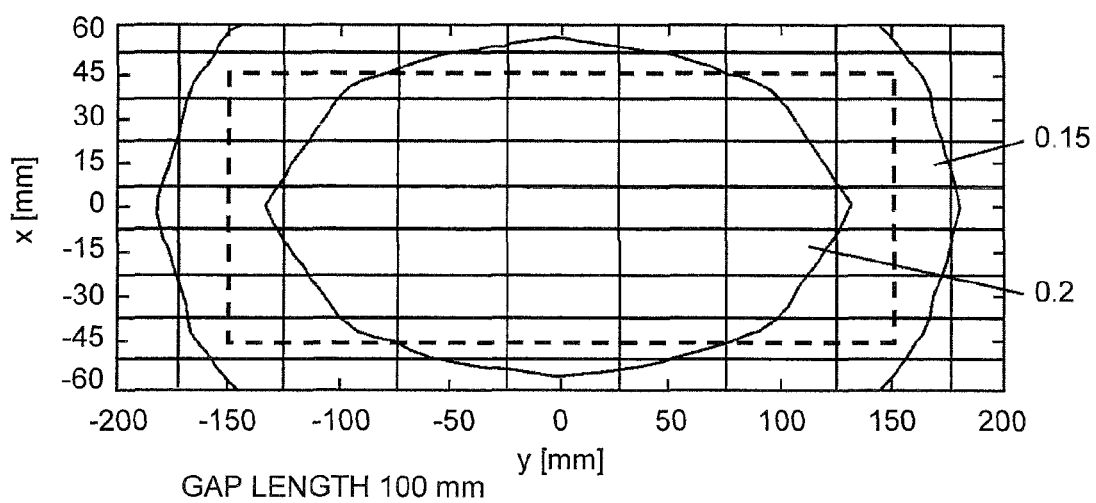
FIG. 14 is a diagram illustrating a relationship between the positional deviation in the front-rear/left-right directions and a value of b (gap length is 100 mm)

FIG. 12 illustrates a result of measurement in which the gap length is set to 40 mm (lower limit of the power transferable range in FIG. 20) and the value of b is measured by changing the amounts of deviation in the x direction and the y direction. FIG. 13 illustrates a result of measurement in which the gap length is set to 70 mm (normal state) and the value of b is measured by changing the amounts of deviation in the x direction and the y direction. FIG. 14 illustrates a result of measurement in which the gap length is set to 100 mm (upper limit of the power transferable range) and the value of b is measured by changing the amounts of deviation in the x direction and the y direction. The dashed line rectangles illustrated in FIGS. 12, 13, and 14 represent the acceptable range in the front-rear direction and the left-right direction in FIG. 20.

From FIGS. 12, 13, and 14, it is known that the value of b is significantly changed by the positional deviation of the gap length (positional deviation in the z direction) and is highly sensitive to the positional deviation in the z direction. Further, it is possible to know the direction of the deviation of the gap length from the value of b.

Therefore, the acceptable range of the positional deviation of the power receiving coil with respect to the power transmission coil can be set by using the value of b, the detection voltages Vy1 and Vy2 of the search coils Cy1a, Cy1b, Cy2a, and Cy2b, and the detection voltages Vx1 and Vx2 of the search coils Cx1 and Cx2 as indexes.

When the acceptable range is set by using these indexes, the direction of the positional deviation can be known, so that the correction is easily performed when the power receiving coil is out of the acceptable range.

Figure 15:
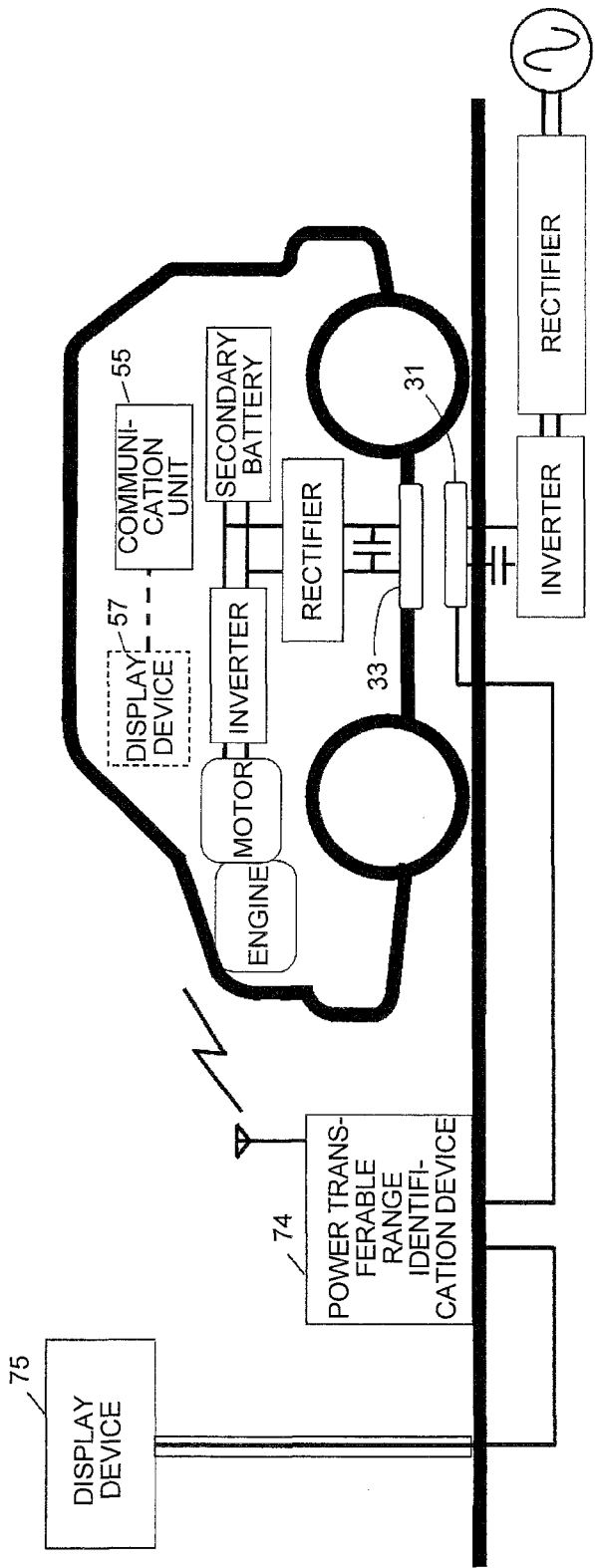
FIG. 15 is a diagram illustrating a power transfer station in which a power transferable range identification device and a display device are installed.

For example, as illustrated in FIG. 15, a power transferable range identification device 74 that acquires the detection voltages of the search coils Cx1, Cx2, Cy1a, Cy1b, Cy2a, and Cy2b provided in the power transmission coil 31 and determines suitability of a vehicle stop position and a display device 75 that displays information transmitted from the power transferable range identification device 74 to a driver are installed in a power transfer station, so that it is possible to display whether the vehicle is parked in the power transferable range and in which direction the vehicle stop position should be changed when the vehicle is out of the power transferable range.

The power transferable range identification device 74 determines that the stop position of the vehicle in the front-rear direction is suitable when a difference between the detection voltage Vx1 of the search coil Cx1 and the detection voltage Vx2 of the search coil Cx2 is smaller than a threshold value and Vx1 and Vx2 are smaller than or equal to a prescribed value. Further, the power transferable range identification device 74 determines that the stop position of the vehicle in the left-right direction is suitable when a difference between the voltage Vy1 calculated from the detection voltages of the search coils Cy1a and Cy1b and the voltage Vy2 calculated from the detection voltages of the search coils Cy2a and Cy2b is smaller than a threshold value and Vy1 and Vy2 are smaller than or equal to a prescribed value. Further, the power transferable range identification device 74 acquires information of the secondary voltage from a communication unit 55 of the vehicle and calculates the value of b by the (Expression 7) (VIN and a are assumed to be standardized values), and when the value of b is within a prescribed range, the power transferable range identification device 74 determines that the gap length is suitable.

Then, the power transferable range identification device 74 displays that power can be transferred on the display device 75.

Further, the power transferable range identification device 74 displays "Move the vehicle backward" on the display device 75 when a difference between Vx1 and Vx2 is greater than a threshold value and Vx1>Vx2, and displays "Move the vehicle forward" when the difference between Vx1 and Vx2 is greater than the threshold value and Vx1<Vx2. Further, the power transferable range identification device 74 displays "Move the vehicle rightward" on the display device 75 when a difference between Vy1 and Vy2 is greater than a threshold value and Vy1>Vy2, and displays "Move the vehicle leftward" when the difference between Vy1 and Vy2 is greater than the threshold value and Vy1<Vy2. Further, the power transferable range identification device 74 displays a message for moving the vehicle to a power transfer lane in which the gap length is great when the value of b is greater than a prescribed range, and displays a message for moving the vehicle to a power transfer lane in which the gap length is small when the value of b is smaller than the prescribed range.

The display device 75 may be colored lamps such as a traffic signal.

Information of the power transferable range identification device 74 may be transmitted to the vehicle by the communication unit 55 and the information may be displayed on a display device 57 in the vehicle.

As obvious from FIGS. 13 and 14, when the acceptable range of the positional deviation is set by the dimensions as illustrated in FIG. 20, even in the acceptable range, an area where the value of b is low (power transfer efficiency is low) is included. However, when the acceptable range is set by the value of b and the detection voltages of the search coils, an accurate acceptable range can be set by combining the value of b and the detection voltages of the search coils.

Figure 16:
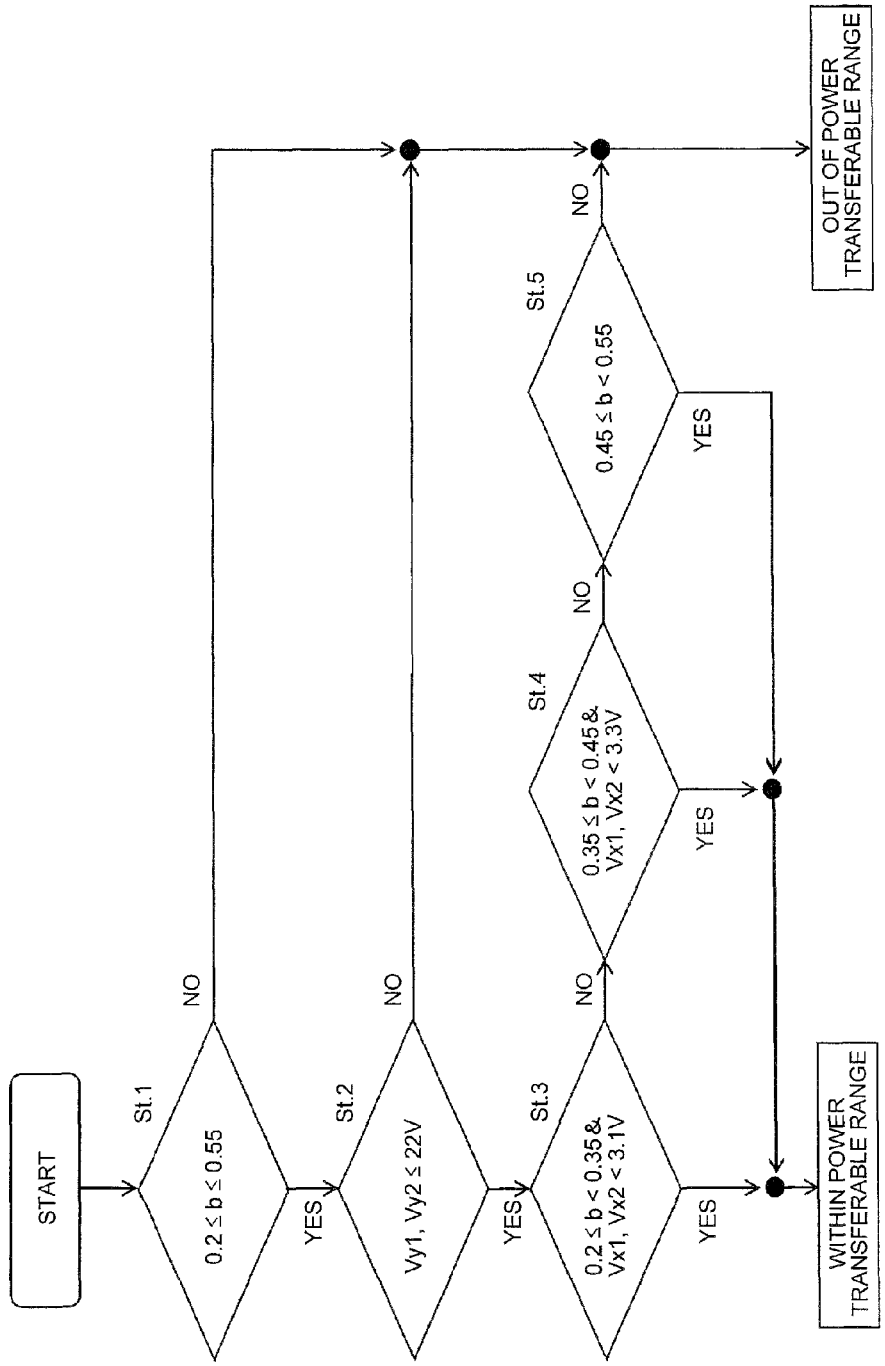
FIG. 16 is a flowchart for determining an acceptable range of the positional deviation.

FIG. 16 illustrates a flowchart for determining the acceptable range which is an example of the above.

In the determination, the measurement results described below are used to determine the acceptable range of the positional deviation.

(1) As known from FIGS. 12, 13, and 14, although the value of b is highly sensitive to the positional deviation of the gap length (the positional deviation in the z direction), the value of b is also affected by the positional deviation in the front-rear direction (x direction) and the left-right direction (y direction).

(2) Similarly, although the voltages Vx1 and Vx2 of the search coils are highly sensitive to the positional deviation in the x direction, the voltages Vx1 and Vx2 are also affected by the positional deviation in the y direction and the z direction.

(3) Further, although the voltages Vy1 to Vy4 of the search coils are highly sensitive to the positional deviation in the y direction, the voltages Vy1 to Vy4 are also affected by the positional deviation in the x direction and the z direction.

(4) As known from FIGS. 8 and 10, the voltages of the search coils generally increase when the positional deviation increases.

Step 1: From the measurement result in FIG. 14, when the value of b is smaller than 0.2, the gap length exceeds the upper limit of the power transferable range (FIG. 20), so that it is determined to be out of the power transferable range. Further, from the measurement result in FIG. 12, when b is greater than 0.55, the gap length is smaller than the lower limit of the power transferable range, so that it is determined to be out of the power transferable range. If $0.2 \leq b \leq 0.55$, the process proceeds to step 2.

Step 2: From the measurement result in FIG. 10, when the voltages Vy1 and Vy2 of the search coils exceed 22 V, the positional deviation exceeds the acceptable range in the y direction, so that it is determined to be out of the power transferable range. If Vy1, $Vy2 \leq 22$ V, the process proceeds to step 3.

Step 3: From the measurement results in FIGS. 8 and 13, when Vx1, Vx2<3.1 V, if $0.2 \leq b < 0.35$, it is determined to be within the acceptable range.

Step 4: In the case of Vx1, Vx2<3.3 V in which the positional deviation in the front-rear direction is greater than that in step 3, the value of b is further increased, so that when $0.35 \leq b < 0.45$, it is determined to be within the acceptable range.

Step 5: Even when the condition of step 4 is not satisfied, from the measurement result in FIG. 12, when $0.45 \leq b < 0.55$, it is determined to be within the acceptable range.

Figure 17A:
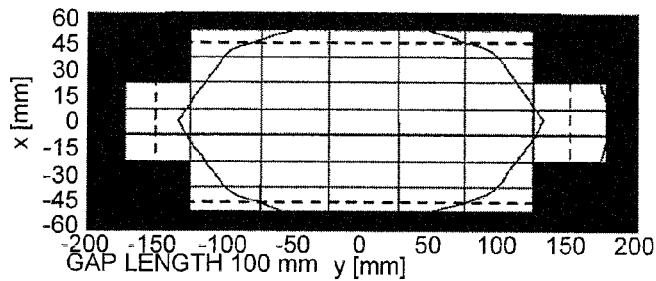
FIGS. 17A-17C are diagrams illustrating a range determined to be within the acceptable range of the positional deviation in the flowchart in FIG. 16.
Figure 17B:
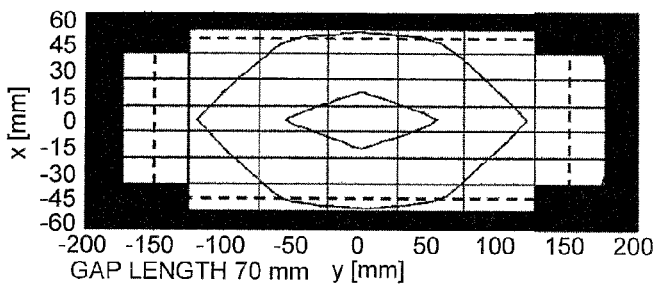
Figure 17C:
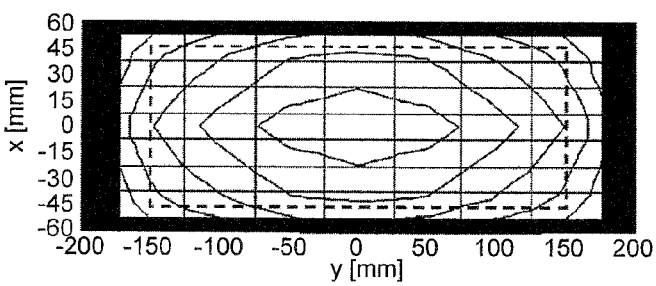

FIG. 17 illustrates the acceptable range of the positional deviation determined by the flowchart in FIG. 16. When the acceptable range of the positional deviation is set by using the value of b and the detection voltages of the search coils as indexes in this way, an accurate acceptable range can be set.

Figure 18:
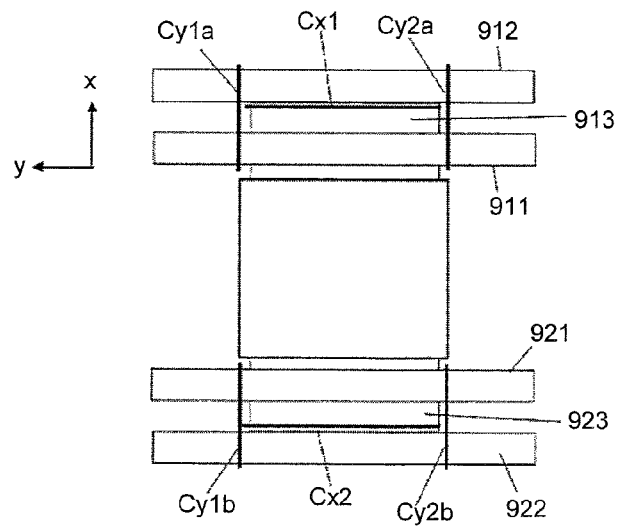
FIG. 18 is a diagram illustrating another example of the power transmission coil according to the embodiment of the present invention.

FIG. 18 illustrates another example of the power transmission coil.

In this power transmission coil, two magnetic poles of the H-shaped core includes two core members 911 and 912 and two core members 921 and 922 respectively, the search coils Cy1a and Cy2a are wound around the circumferences of the two core members 911 and 912, the search coils Cy1b and Cy2b are wound around the circumferences of the two core members 921 and 922, the search coil Cx1 is wound around a core member 913 that connects the gap between the core members 911 and 912, and the search coil Cx2 is wound around a core member 923 that connects the gap between the core members 921 and 922.

In this power transmission coil, the search coils Cx1 and Cx2 can thoroughly capture the magnetic flux proceeding straight in an extending direction of the wire-wound portion (and the magnetic flux proceeding in the opposite direction), so that the detection accuracy of the search coils Cx1 and Cx2 is improved and the acceptable range of the positional deviation in the front-rear direction can be highly accurately determined.

Figure 23:
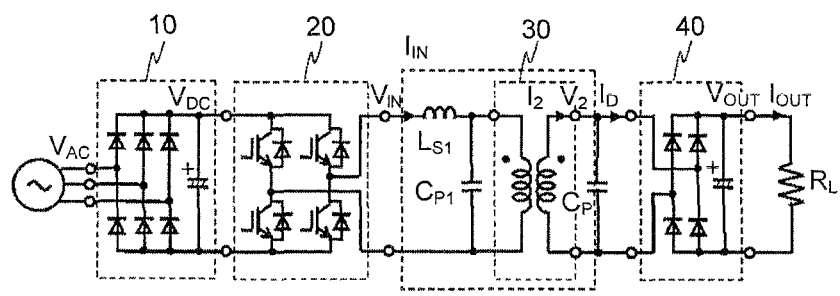
FIG. 23 is a diagram illustrating a contactless power transfer method using parallel capacitors on the primary side, which is described in Non-Patent Literature 1.
Figure 24:
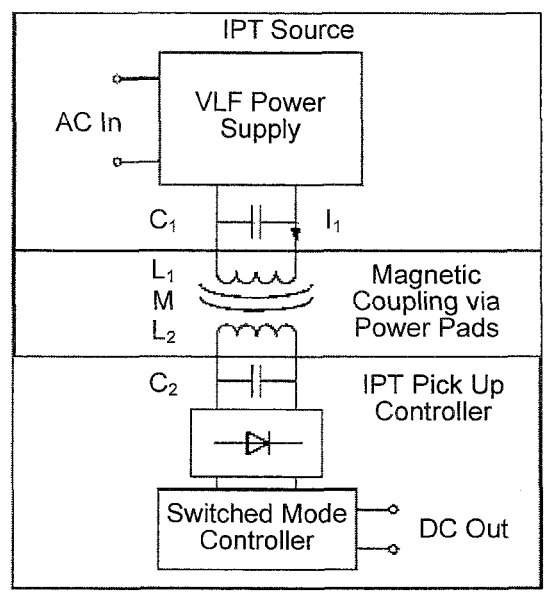
FIG. 24 is a diagram illustrating a contactless power transfer method using parallel capacitors on the primary side, which is described in Non-Patent Literature 2.

Here, as a contactless power transfer method, a method is described in which a series capacitor is inserted on the primary side and a parallel resonant capacitor is inserted on the secondary side. However, contactless power transfer methods described in Non-Patent Literature 1 and Non-Patent Literature 2, in which a parallel capacitor is inserted on the primary side and a parallel resonant capacitor is inserted on the secondary side, and other contactless power transfer methods are known. FIG. 23 illustrates a circuit system described in Non-Patent Literature 1 and FIG. 24 illustrates a circuit system described in Non-Patent Literature 2.

Also in these circuit systems, the first, the second, and the third search coils can be used as indexes of positional deviation.

A case has been described in which whether the positional deviation of the power receiving coil with respect to the power transmission coil in the x direction (front-rear direction), the y direction (left-right direction), and the z direction (gap length) is within the acceptable range is determined by using the detection voltages of the first, the second, and the third search coils and the value of b. However, for example, regarding the positional deviation in the front-rear direction, the stop position of the vehicle in the front-rear direction is controlled by the car stop 7 in FIG. 1 or the like, the gap length is assumed to be constant, and only the suitability of the positional deviation in the left-right direction may be determined by using the detection voltages of the first and the second search coils.

By assuming the gap length to be constant, it is possible to determine the suitability of the positional deviation in the left-right direction by using the detection voltages of the first and the second search coils and determine the suitability of the positional deviation in the front-rear direction by using the detection voltages of the third search coils.

Although a case has been described in which the first, the second, and the third search coils are provided in the H-shaped core of the power transmission coil, it is also possible to provide the first, the second, and the third search coils in the H-shaped core of the power receiving coil. At this time, the H-shaped core of the power receiving coil is formed as illustrated in FIG. 7 or FIG. 18.

Figure 19:
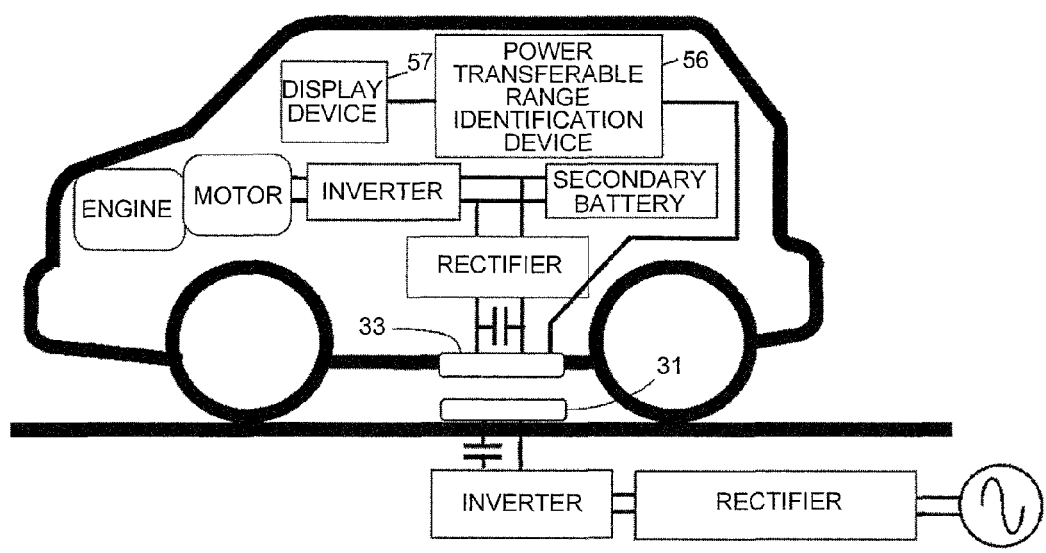
FIG. 19 is a diagram illustrating a vehicle in which a power transferable range identification device and a display device are installed.
Figure 21A:
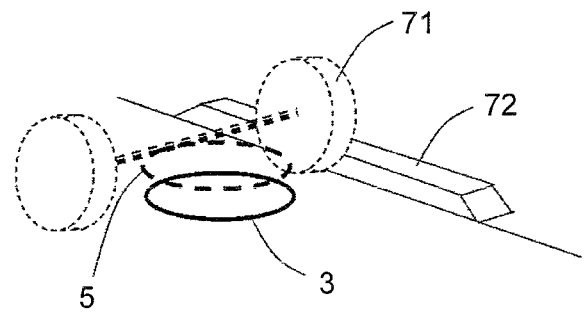
FIGS. 21A-21B are diagrams illustrating a conventional determination method 1 of positional deviation.
Figure 21B:
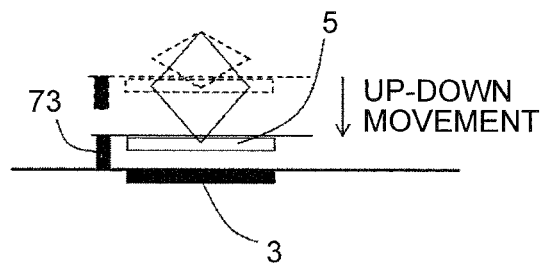
Figure 22:
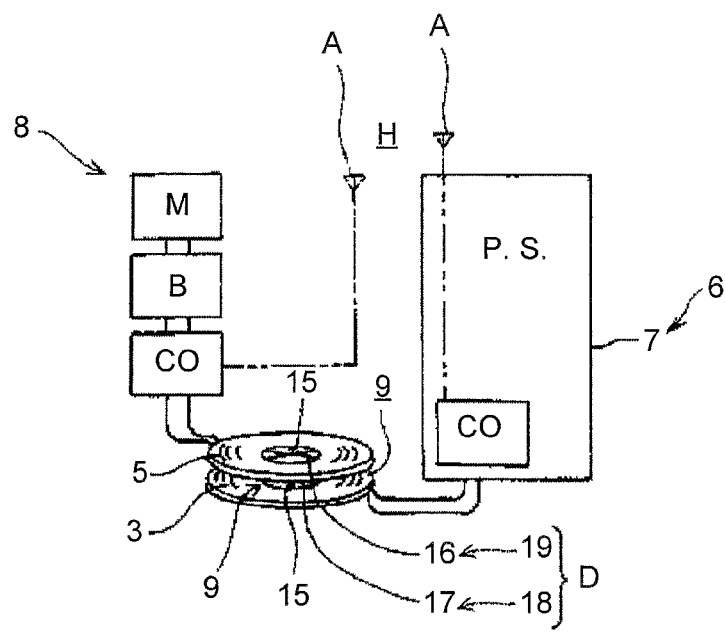
FIG. 22 is a diagram illustrating a conventional determination method 2 of positional deviation.

FIG. 19 illustrates a case in which a power transferable range identification device 56 that acquires the detection voltages of the search coils of the power receiving coil 33 and determines suitability of a vehicle stop position and the display device 57 that displays information of the determination are provided in a vehicle.

The power transferable range identification device 56 can determine the suitability of the vehicle stop position in the front-rear direction and the left-right direction from the detection voltages of the search coils, and when the vehicle stop position is not suitable, the power transferable range identification device 56 can identify in which direction the vehicle should be corrected. When determining the suitability of the gap length, it is possible to calculate the value of b by the (Expression 7) by acquiring information of the secondary voltage from inside the vehicle (regarding VIN and a, standardized values may be used or the value of VIN may be transmitted from the inverter on the ground to the power transferable range identification device 56 in the vehicle by the communication unit 55).

As the display device 57, a display screen of a car navigation system installed in the vehicle can be used and a correction direction, which is indicated from the power transferable range identification device 56 when the vehicle stop position is not suitable, can be displayed as an arrow or the like on the screen of the car navigation system to guide the movement of the vehicle.

Industrial Applicability

The contactless power transfer device for a moving object of the present invention can accurately determine whether the positional deviation between the power transmission coil and the power receiving coil is included in the power transferable range, so that the contactless power transfer device for a moving object can be widely used for moving objects, such as vehicles, carriers, and mobile robots.

REFERENCE SIGNS LIST 3 power transmission coil
5 power receiving coil
7 car stop
10 rectifier
20 inverter
30 contactless power transfer transformer
31 power transmission coil
32 primary side series capacitor
33 power receiving coil
34 secondary side parallel resonant capacitor
35 main magnetic flux
40 rectifier
50 wire
51 secondary battery
52 inverter
53 motor
54 engine
55 communication unit
56 power transferable range identification device
57 display device (in a vehicle)
65 aluminum plate
66 aluminum plate
71 tire
72 concrete block
73 spacer
74 power transferable range identification device
75 display device (on the ground)
80 H-shaped core
81 magnetic pole
82 magnetic pole
83 wire-wound portion
811 magnetic pole end
812 magnetic pole end
821 magnetic pole end
822 magnetic pole end
911 core member
912 core member
913 core member
921 core member
922 core member
923 core member
3181 magnetic pole
3182 magnetic pole
3183 wire-wound portion
3381 magnetic pole
3382 magnetic pole
3383 wire-wound portion
Cx1 search coil
Cx2 search coil
Cy1a search coil
Cy1b search coil
Cy2a search coil
Cy2b search coil

The invention claimed is:

1. A contactless power transfer device for a moving object, in which a power transmission coil connected to a high-frequency power source is installed on the ground, a power receiving coil facing the power transmission coil with a gap in between is installed in the moving object, and power is transferred from the power transmission coil to the power receiving coil, wherein
   each of the power transmission coil and the power receiving coil has an H-shaped core, core portions in parallel with each other in the core form magnetic poles, and a core portion that connects between the magnetic poles facing each other forms a wire-wound portion around which a wire is wound,
   the power receiving coil is installed in the moving object so that the core portions in parallel with each other are perpendicular to a front-back direction of the moving object,
   in the H-shaped core of the power transmission coil or the power receiving coil, at least one of the magnetic poles includes a first search coil that intersects a magnetic flux proceeding toward one end of the magnetic pole from the wire-wound portion and a magnetic flux proceeding in the opposite direction and a second search coil that intersects a magnetic flux proceeding toward the other end of the magnetic pole from the wire-wound portion and a magnetic flux proceeding in the opposite direction, and
   the contactless power transfer device for a moving object further includes a power transferable range identification unit that uses a voltage detected by the first search coil or the second search coil to identify whether the power transmission coil and the power receiving coil are located inside the power transferable range.

2. The contactless power transfer device for a moving object according to claim 1, wherein
   the H-shaped core of the power transmission coil or the power receiving coil further includes a third search coil that intersects a magnetic flux proceeding straight in the magnetic pole in an extending direction of the wire-wound portion and a magnetic flux proceeding in the opposite direction, and
   the power transferable range identification unit identifies whether the power transmission coil and the power receiving coil are located inside the power transferable range by using a voltage detected by the third search coil.

3. The contactless power transfer device for a moving object according to claim 1, further comprising:
   a primary side capacitor that is connected in series between the power transmission coil and the high-frequency power source; and
   a secondary side resonant capacitor that is connected in parallel with the power receiving coil,
   wherein when a primary voltage, which is an output voltage of the high-frequency power source, is defined as VIN, a secondary voltage applied to both ends of the power receiving coil is defined as V2, the number of windings of the power transmission coil is defined as N1, and the number of windings of the power receiving coil is defined as N2, the power transferable range identification unit identifies whether the power transmission coil and the power receiving coil are located inside the power transferable range by using a value of b represented by $b=(VIN/V2)(N2/N1)$.

4. The contactless power transfer device for a moving object according to claim 1, wherein the first search coil and the second search coil are wounded around a circumference of the magnetic pole so that the magnetic pole is included inside the coils.

5. The contactless power transfer device for a moving object according to claim 2, wherein the third search coil is arranged on surfaces of the magnetic pole so that a surface of the magnetic pole, which extends in an extending direction of the wire-wound portion, and a side surface of the magnetic pole, which is perpendicular to the extending direction, are included inside the coil.

6. The contactless power transfer device for a moving object according to claim 2, wherein
   in the H-shaped core of the power transmission coil or the power receiving coil, the magnetic pole includes two cores with a gap in between,
   the first search coil and the second search coil are wounded around circumferences of the two cores so that the two cores are included inside the coils, and
   the third search coil is wound around a core member that connects the gap between the two cores.

7. The contactless power transfer device for a moving object according to claim 1, wherein the power transferable range identification unit provides information of a moving direction for the power transmission coil and the power receiving coil to enter the power transferable range when the power transmission coil and the power receiving coil are not located inside the power transferable range.

8. The contactless power transfer device for a moving object according to claim 7, wherein
   the power transferable range identification unit is provided in a vehicle, and
   the information of a moving direction provided from the power transferable range identification unit is displayed on a display screen of a car navigation system installed in the vehicle.

* * * * *